United States Patent
Potlapally et al.

(10) Patent No.: US 9,294,282 B1
(45) Date of Patent: Mar. 22, 2016

(54) CRYPTOGRAPHICALLY VERIFIED REPEATABLE VIRTUALIZED COMPUTING

(71) Applicant: Amazon Technologies, Inc., Reno, NV (US)

(72) Inventors: Nachiketh Rao Potlapally, Arlington, VA (US); Eric Jason Brandwine, Haymarket, VA (US); Deepak Singh, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 47 days.

(21) Appl. No.: 13/933,040

(22) Filed: Jul. 1, 2013

(51) Int. Cl.
*H04L 29/06* (2006.01)
*H04L 9/32* (2006.01)

(52) U.S. Cl.
CPC ............ *H04L 9/3236* (2013.01); *H04L 9/3234* (2013.01)

(58) Field of Classification Search
CPC ............................ H04L 9/3234; H04L 9/3236
USPC ............ 718/1, 100; 717/126, 136; 714/38.14; 713/176, 2; 380/279
See application file for complete search history.

(56) References Cited

U.S. PATENT DOCUMENTS

| | | | |
|---|---|---|---|
| 8,347,288 B1 * | 1/2013 | Brandwine | 718/1 |
| 8,572,613 B1 * | 10/2013 | Brandwine | 718/100 |
| 2009/0204964 A1 * | 8/2009 | Foley et al. | 718/1 |
| 2013/0086383 A1 * | 4/2013 | Galvao De Andrade et al. | 713/171 |

OTHER PUBLICATIONS

Araujo et al., "Validating Desktop Grid Results by Comparing Intermediate Checkpoints", pp. 13-24, 2008, Achievements in European Research on Grid Systems.*

* cited by examiner

*Primary Examiner* — Izunna Okeke
*Assistant Examiner* — Hee Song

(57) ABSTRACT

A virtualized system that is capable of executing a computation that has been identified as a repeatable computation and recording various representations of the state of the computing environment throughout the execution of the repeatable computation, where the state of the computing environment can be cryptographically signed and/or verified using a trusted platform module (TPM), or other cryptographic module. For example, a TPM embedded in the host computing device may generate a hash measurement that captures the state of the repeatable computation at the time of the computation. This measurement can be digitally signed using one or more cryptographic keys of the TPM and recorded for future use. The recorded state can subsequently be used to repeat the computation and/or determine whether the computation was repeated successfully according to certain defined criteria.

18 Claims, 8 Drawing Sheets

CRYPTOGRAPHICALLY VERIFIED REPEATABLE VIRTUALIZED COMPUTING

BACKGROUND

In a typical model of computing, input data is provided to a computational process to produce a result, which may then be used for some purpose. For example, a user may insert a compact disc (CD) containing music into a computer, and a program executing on the computer may read the music data, convert it to an MP3-encoded format, and store it within a library for use with a portable media device. In many contexts, once a computational result is generated, there may be little concern over whether the result can be regenerated in exactly the same way. For example, having once encoded the CD, the above user might be unlikely to ever want to do so again, unless the encoded files were lost or corrupted. Even then, the user might simply re-encode the CD using a different computer or program, because it is unlikely that variations in the encoded output would be noticeable to the user. Even though two audio files may be different, they may be functionally equivalent in their actual use.

However, for some computing applications, being able to repeat a computation so as to reproduce results (e.g., exactly, or to a defined degree) may be important. For example, as part of the diligence required for regulatory approval, a drug manufacturer may supply the results of computer simulations of drug behavior. At some later time, it may be necessary to validate the results. For example, the manufacturer may be required to prove that the results upon which regulatory approval was granted were not fabricated, to prove that the results were generated under required assumptions or constraints, to prove that a required protocol was followed in generating the results, or may need to demonstrate the integrity of the results for other reasons. Thus, the manufacturer may need the capability to repeat the original simulations, in order to demonstrate that the original results follow from the original computational inputs.

But even small variations in hardware or software configuration between the time results are originally generated and the time they are reproduced may affect the exactness with which the reproduced results match the original ones, especially in applications where a high degree of numerical precision is needed. Moreover, hardware and software evolve at a rapid pace, with new versions of both emerging frequently. Thus, the pace of the technology replacement cycle tends to frustrate the goal of producing repeatable results, particularly after periods of years have elapsed.

BRIEF DESCRIPTION OF THE DRAWINGS

Various embodiments in accordance with the present disclosure will be described with reference to the drawings, in which.

DETAILED DESCRIPTION

Figure 1:
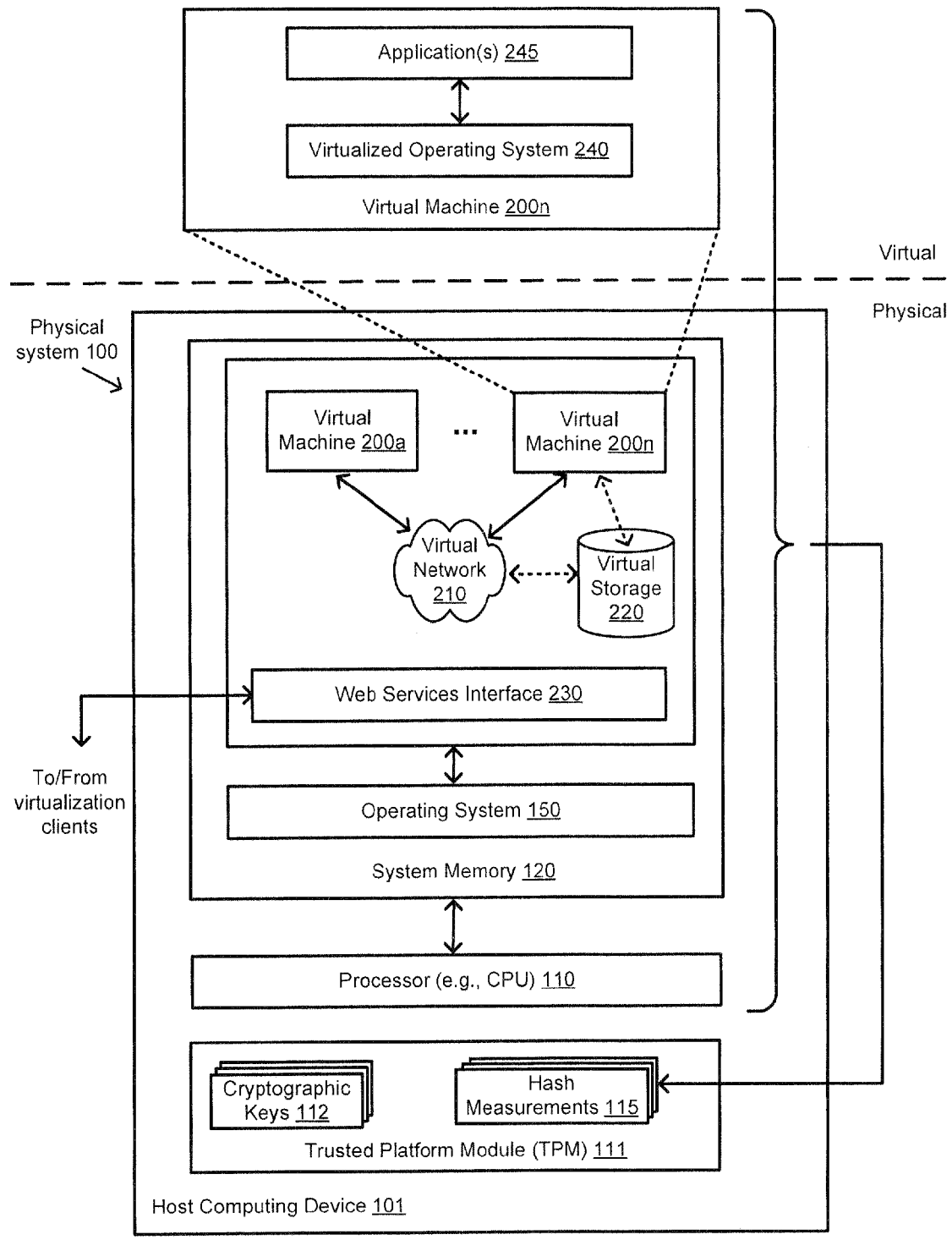
FIG. 1 illustrates an embodiment or a system configured to implement virtualized computing, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for performing repeatable computations, such as computations that require repetition at a later time with a high degree of precision. In particular, embodiments described herein provide a virtualized system that is capable of executing a computation that has been identified as a repeatable computation and recording various representations of the state of the computing environment throughout the execution of the repeatable computation, where the state of the computing environment can be cryptographically signed and/or verified using a trusted platform module (TPM), or other cryptographic module. For example, during various points in the computation, a TPM embedded in the host computing device can be used to verify the resource stack that is executing the repeatable computation. In addition, the host computing device may generate a hash measurement that captures the state of the computation. This hash measurement can be digitally signed using one or more cryptographic keys of the TPM and recorded for future use. The recorded state can subsequently be used to repeat the computation and/or determine whether the computation was repeated successfully according to certain defined criteria.

In various embodiments, the virtualized system executing the repeatable computation can be implemented as one or more virtual machines executing on a host computing device. The host computing device may further include a cryptographic module, such as a trusted platform module (TPM) that can be used to cryptographically sign and/or verify the state of the computing device and/or the repeatable computation at various times. In various embodiments, a cryptographic module may be implemented as hardware, software or combination thereof, and may include any secure store or cryptographic processor capable of securely storing cryptographic keys and other secure information. Additionally, the host computing device can include a virtualization module, such as a hypervisor or virtual machine manager (VMM), that manages the execution of the virtual machines and provides an interface (e.g., application programming interface (API)) to enable remote users to access the virtual machines over a network connection (e.g., the Internet). The users can submit requests to the virtual machines using the interface, such as requests to execute computations that have been identified as being repeatable.

In accordance with an embodiment, when the virtualized system receives a request (e.g., API request) from a user to perform the repeatable computation, the system can identify one or more checkpoints in the repeatable computation, such as points in time or process flow at which the system will record the representation of the state of the computing environment. The system can then execute the computation using the one or more virtual machines on the host computing device. In various embodiments, when the process of executing the computation reaches each checkpoint, the system can verify the state of the computing environment on the host computing device, as well as generate a hash measurement of the state of the computation at the checkpoint. The state of the computing environment can be verified by comparing a number of runtime measurements obtained at the time of the checkpoint to a set of boot time measurement values recorded in the TPM. Any mismatch between the runtime measurement and the boot time measurement in the TPM may indicate that the host computing device or some component thereon has been altered or tampered with. Additionally, the system can sign the hash measurement of the state of the computation by using a cryptographic key, such as a key embedded in the TPM or derived from a key embedded in the TPM. Signing the hash measurements in this manner can verify that the state of the software and hardware operating on the device during the various points in time of the repeatable computation is accurate and have not been tampered with by various software processes. Once the computation has been completed, the system can generate a cumulative hash measurement of the entire process of the repeatable computation based on all of the hash measurements generated at each checkpoint. This cumulative hash measurement can be used to by the user to verify the success of repeating the entire computation since the cumulative measurement generated by the repeated execution of the computation should only match the original cumulative measurement if the measurements generated at each checkpoint match respectively. In this manner, the use of checkpoints and the TPM as described herein can enable the repeatable computation to be performed securely as a verifiable process that can enable the computation to be repeated within a high degree of precision.

Introduction to General Repeatable Computing

As noted above, in certain contexts, being able to precisely and accurately reproduce computational results may be desirable. In addition to the regulatory compliance example mentioned above, such contexts might include scientific peer review, the computational analysis of evidence in legal proceedings (e.g., DNA evidence, fingerprints, etc.), complex financial accounting, aerospace engineering, civil engineering, or any other context in which the integrity of a computational process may be subject to questioning or validation. In general, applications or types of computation that are expected to produce repeatable results may be referred to as "repeatable applications" or "repeatable computing."

A number of factors may affect the repeatability of results. For example, the same set of source code (i.e., an abstract specification of computational behavior) might produce different object code (i.e., machine instructions executable by a microprocessor) when compiled for different processors or instruction set architectures (ISAs). Two different compilers may produce different object code from the same source code even when targeted to the same ISA. Thus, even though these various sets of object code may be functionally equivalent to the original source code, they may not be identically expressed. Such variations would fail a stringent repeatability test that requires the hardware state of the machine (or at least a defined region of the hardware state that is specific to the application) to be bitwise identical across repetitions.

Other factors may also cause divergent results. For example, source code authors often rely on functions or routines provided in external libraries, for example, by an operating system or by third parties. Thus, using a different version of an OS or a particular library may yield differences in execution behavior for the same application.

Applications that depend upon generating results with a high degree of numerical precision may be particularly sensitive to variations in the hardware or software making up the computing environment. For example, different versions of floating-point arithmetic hardware may produce slightly different results (e.g., in the least significant digit(s)) for the same operation, depending on how the different implementations handle rounding errors, approximation of transcendental functions, or other issues related to high-precision arithmetic. Similarly, in some instances, applications may depend upon software libraries to perform high-precision arithmetic. Results produced by different versions of such libraries, or even the same library running on different hardware, may vary.

Depending upon the stringency with which an application is expected to be repeatable and the uncertain effects that configuration changes may have on repeatability, there may be little choice but to maintain a computer system in as close to a static configuration as possible for as long as an application is expected to be repeatable. For example, this may entail preserving the same hardware and software configuration of a computer system for a number of years.

As an alternative to preserving legacy systems for arbitrary lengths of time, implementing repeatable applications using virtualized computing may offer greater flexibility and more efficient utilization of computing resources. In the following sections, an overview of virtualized computing is first provided. Various techniques for implementing cryptographically verified repeatable computing using virtualized computing systems and trusted platform modules (TPMs) are described. Finally, an example computer system that may be configured to implement various ones of the described techniques is discussed.

Overview of Virtualized Computing

Generally speaking, virtualized computing (which may also be referred to as virtual computing or virtualization) may refer to techniques for configuring a physical computer system so that it appears, from a software perspective, to behave like multiple independent "virtual" computer systems. Virtualized computing may be distinguished from a conventional multitasking operating system (OS). A typical OS may provide a number of protected memory spaces in which different processes may execute without interfering with one another, as well as a common set of privileged routines to manage execution of those processes and coordinate access to system resources. By contrast, virtualized computing techniques may be employed to configure multiple virtual machines, each of which may execute its own operating system, which may be different for different virtual machines.

By decoupling the configuration and operation of a virtual machine from the underlying physical hardware on which the virtual machine executes, virtualized computing may enable a user to configure a virtual machine according to a defined set of specifications, and to recreate the previously configured virtual machine at a later time, all without altering the configuration of the underlying physical hardware. This may facilitate the implementation of repeatable computing, in that it may be considerably easier to restore the configuration of a virtual machine than to restore or maintain the configuration of a physical machine.

An example of a system that may be configured to implement virtualized computing is illustrated in FIG. 1. In the illustrated embodiment, physical system 100, such as may be implemented on a host computing device 101, includes a processor 110 coupled to a system memory 120. For example, processor 110 may correspond to any type of microprocessor configured to execute instructions defined by a particular instruction set architecture (ISA), such as the x86/x64 ISA, the PowerPC™ ISA, the SPARC™ ISA, the ARM™ ISA, or any other suitable ISA. System memory 120 may correspond to any type of storage device configured to store data and instructions executable by processor 110. For example, system memory 120 may include any of various types of random access memory (RAM), read-only memory (ROM), non-volatile memory (e.g., flash memory), magnetic memory, or any other suitable type of memory.

System memory 120 may be configured to store instructions and data that, when executed by processor 110 or another processor, are configured to implement an operating system 150 and virtualization module 160. Generally speaking, operating system 150 may correspond to any suitable type of operating system, such as a version of Microsoft Windows™, Apple MacOS™, Unix, Linux, or another operating system. Typically, operating system 150 may be configured to serve as an interface between applications and the resources provided by the computer system, such as memory, mass storage devices, communications devices, system services, and the like.

Virtualization module 160 may be configured to implement an environment within which multiple different virtual machines may operate. Virtualization module 160 may also be referred to as a hypervisor or a virtual machine monitor (VMM). In the illustrated embodiment, virtualization module 160 may be implemented as a distinct layer of software from operating system 150, a configuration that may be referred to as a "hosted hypervisor." In other embodiments, rather than running in a distinct layer, virtualization module 160 may be integrated with operating system 150 in a configuration that may be referred to as a "native hypervisor."

Some examples of hosted-hypervisor implementations of virtualization module 160 may include VMware ESX/ESXi™, VMware Fusion™, Microsoft Virtual PC™, VirtualBox™, and Parallels Desktop™. Some examples of native-hypervisor implementations may include Xen, VMware Infrastructure™, Logical Domains Hypervisor™, and Parallels Server™. Other examples are possible and contemplated.

In the illustrated embodiment, virtualization module 160 is configured to implement a number of virtual machines 200a-n, as well as a virtual network 210, virtual storage 220, and a web services interface 230. Examples of each of these elements will be discussed in turn, it being noted that numerous variations and alternative configurations are possible. In various embodiments, various elements may be referred to using alternative terminology. For example, in the context of the Amazon Elastic Compute Cloud (EC2) service, individual virtual machines 200 may correspond to "instances," and the state of various virtual machines 200 (e.g., their applications, data, and configuration) may correspond to "Amazon Machine Images" or AMIs.

It is noted that processes that implement various virtualized elements such as virtual machines 200, virtual network 210, and virtual storage 220 may be configured to execute on different physical hardware than virtualization module 160 itself. For example, virtualization module 160 may be configured to employ remote procedure calls or other techniques to cause a process or thread corresponding to a particular virtual machine 200, or any other virtualized element, to be executed on a different physical system that possibly may have a different configuration than physical system 100.

Any number of virtual machines 200 may be deployed, depending on the resource capabilities of the underlying physical system 100 as well as virtualization module 160. Generally speaking, each of virtual machines 200 may be configured to host its own copy of an operating system and applications, which may execute independently of the other virtual machines 200. For example, FIG. 1 illustrates virtual machine 200n as including a virtual operating system 240 as well as one or more applications 245. Virtual operating system 240 may correspond to any suitable operating system, which may include any of the types of operating systems mentioned above with respect to operating system 150. Virtual operating system 240 may also be distinct from the underlying operating system 150 that executes on physical computer system 100. For example, virtual operating system 240 and operating system 150 may be completely different operating systems. Alternatively, they may correspond to the same type of operating system, but may each have distinct copies of data structures and/or executable code, and may be configured to execute separately from one another.

Each virtual machine 200 may be configured to operate as though it were an independent physical machine possessing those resources of physical system 100 that have been allocated to the virtual machine 200. For example, virtual machine 200a may be configured to execute a version of Microsoft Windows™ and one or more Windows applications, while virtual machine 200n may be configured to execute a version of Linux and one or more Linux applications. In some embodiments, the operating systems and applications executing on a given virtual machine 200 may be incapable of discerning that they are running in a virtual rather than a physical system. Thus, virtualization may be performed transparently with respect to each virtual machine 200.

In various embodiments, the host computing device 101 may further include a trusted platform module (TPM) 111 or other cryptographic module. The TPM 111 can be any secure processor (e.g., cryptoprocessor), a chip or other secure store that offers facilities for the secure generation of cryptographic keys 112 and is capable of generating one or more hash measurements 115 of the state of the host computing device 101. For example, the TPM 111 may be implemented as an embedded chip (e.g., secure cryptoprocessor) in the motherboard of the host computing device 101 that is not capable of being tampered with or modified by the CPU 110 or other resources of the device. At any given time, such as during boot time of the host computing device, the TPM 111 can inspect the values stored in various pages of system memory 120 and generate hash measurements of the state of the device by applying a hash function to the measured values. For example, the TPM 111 can be used to hash the values associated with the Basic Input and Output System (BIOS), the boot record, the configuration of the virtualization module (e.g., hypervisor), the kernel, and the binary executable files executing on the guest operating system installed on the virtual machine, among others. These hash measurements can be stored in the TPM 111 and later be used as reference values to verify that the state of the host computing device has not been tampered with since the time of the original measurements, such as by comparing the boot time measurements to the runtime measurements to verify that they match. Additionally, the TPM 111 can be embedded with one or more cryptographic keys 112 that may be used to digitally sign or encrypt the hash measurements 115 of the repeatable computation that are to be archived by the host computing device. For example, during one or more checkpoints in the repeatable computation, the host computing device may record hash measurements of the state (i.e., progress) of the computation at each checkpoint. These hash measurements can be signed using a key stored in the TPM 111 in order to ensure authenticity of the measurements. In various other embodiments, the TPM 111 can also provide additional security functionality, including but not limited to generation of cryptographic keys, remote attestation and sealed storage.

Figure 2:
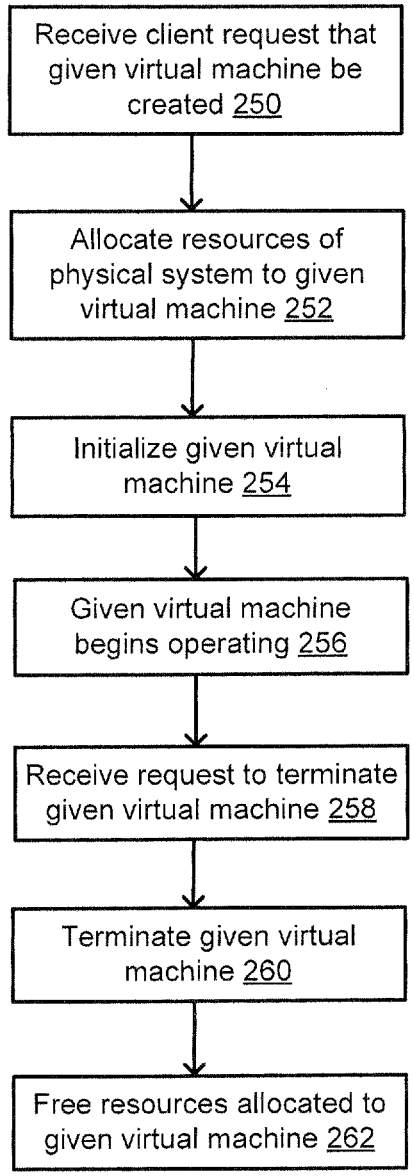
FIG. 2 illustrates an embodiment of a method of instantiating a virtual machine, in accordance with various embodiments.

In various embodiments, virtualization module 160 may be configured to cause virtual machines 200a-n to be instantiated and destroyed in response to configuration requests received by virtualization module 160, e.g., from clients that may be external to physical system 100. As shown in the flow chart embodiment illustrated in FIG. 2, a client may request that a given virtual machine 200 be created (block 250). For example, the client may interact with a configuration interface presented by virtualization module 160 through web services interface 230 (discussed below), through a graphical user interface, or any other suitable type of interface. The client may correspond to a process executing on behalf of a user, either on physical system 100 or on a different system configured to communicate with physical system 100, e.g., via a network.

In various embodiments, the client's request may include configuration parameters for the requested given virtual machine 200. For example, the client may specify particular resources for the given virtual machine 200, such as an amount of memory, a particular level of processor performance, or the like. Alternatively, the client may specify a particular type or class of virtual machine 200 from among a set of available configurations. For example, virtualization module 160 may present generic "small," "medium," "large," and/or other types of virtual machine configurations for selection by the client, each having defined memory, performance, and/or other characteristics.

In some embodiments, the client's request may specify that the given virtual machine 200 should implement floating-point arithmetic entirely through software emulation, instead of employing hardware floating-point resources (such as a hardware floating-point unit accessible through ISA-defined floating-point instructions). For example, in some instances, the behavior of floating-point arithmetic emulated through the use of integer instructions may be more consistent across different hardware platforms than the behavior of floating-point arithmetic implemented using hardware resources. Similarly, in some embodiments, the client's request may specify that the given virtual machine 200 should disable specified advanced computing features, such as instruction set extensions (e.g., Streaming SIMD Extensions/SSE, SSE2, SSE3, SSE4, or other types of extensions for x86 or other ISAs). By restricting the use of such features, it may be possible to repeat the computation performed by given virtual machine 200 on a broader range of systems (e.g., on systems that do not implement the disabled features, and so could not repeat the computation if those features were relied upon).

In some embodiments, the client's request may also include information regarding how the state of the given virtual machine 200 should be initialized. For example, the request may specify the operating system 240 that should be booted, the application(s) 245 that should be available, and/or any data, libraries, or other inputs that may be needed to perform the client's computation. In various embodiments, the client may select initialization state from a number of options (e.g., may select from a list of available operating systems), may provide a detailed memory image reflecting the desired initial state of the given virtual machine 200 (e.g., reflecting executable code and/or data), or a combination of these or other techniques.

In response to a request to create or initialize a given virtual machine 200, virtualization module 160 may be configured to allocate resources of physical system 100 to the given virtual machine 200, such as by setting aside a certain amount of system memory 120 to be used by the given virtual machine 200 as its own virtual system memory (block 252). Virtualization module 160 may also initialize the given virtual machine 200 (block 254). For example, the given virtual machine 200 may be initialized according to the client's specification, or to a default state.

Once configured and initialized (which may occur concurrently or as part of the same operation), given virtual machine 200 may then begin operating (block 256). For example, operating system 240 may boot or resume from a previously defined state. Application(s) 245 may execute, either in an interactive fashion (i.e., receiving input from the client during operation) or autonomously. In various embodiments, as described below, virtualization module 160 may provide given virtual machine 200 with access to storage as well as a virtual network that may allow given virtual machine 200 to communicate with other virtual machines 200.

At some point, a request to terminate given virtual machine 200 may occur (block 258). For example, a client may initiate such a request when the task for which given virtual machine 200 was configured has completed, or for some other reason. Alternatively, virtualization module 160 may initiate such a request, for example in the event that the machine becomes unstable or violates some aspect of the client's terms of use. In response, given virtual machine 200 may be terminated (block 260) and its resources freed for use by other virtual machines (block 262). For example, virtualization module 160 may attempt to perform an orderly shutdown of given virtual machine 200 if possible. As described in further detail below, virtualization module 160 may archive or otherwise preserve the state of given virtual machine 200, information about its configuration within the virtual computing environment, and/or any other salient information. Once these or any other housekeeping tasks have completed, given virtual machine 200 may cease to exist as an entity.

In addition to providing for the configuration and operation of virtual machines 200, virtualization module 160 may be configured to provide for virtualized network connectivity among virtual machines 200 via virtual network 210. For example, virtual network 210 may be configured to emulate a local area network (LAN) or any other suitable type or topology of network. Through virtual network 210, virtual machines 200 may be configured to communicate with one another as though they were physical machines connected to a physical network.

In some embodiments, virtualization module 160 may be configured to bridge virtual networks implemented on different physical systems in order to implement virtual networks of large scale. For example, virtual machines 200 implemented on distinct physical systems 100 may nonetheless be able to communicate with one another as part of the same general virtual network 210. In such embodiments, different instances of virtualization module 160 may be configured to communicate information with one another via a physical network connecting their respective physical systems 100 in order to implement virtual network communication among their virtual machines 200.

Virtualization module 160 may also be configured to provide virtual machines 200 with access to mass storage, shown as virtual storage 220. For example, virtual storage 220 may be configured as a block storage device (e.g., a logical storage volume), a file system, a database, or any other suitable type of mass storage that may be presented to a computer system. Embodiments of virtual storage 220 may also be referred to generically as mass storage resources. In some embodiments, virtual storage 220 may be implemented as a virtual network-connected device accessible to virtual machines 200 via virtual network 210. For example, virtual storage 220 may be configured as a virtualized network attached storage (NAS) device, as a virtualized storage area network (SAN), as a storage service accessible through Internet protocols (e.g., as a web-services-based storage service), or in any other suitable fashion. In some embodiments, virtual storage 220 may be implemented via a service such as Amazon Elastic Block Store (EBS), Amazon Simple Storage Service (S3), or via another suitable storage service model.

In some embodiments, management of virtual storage 220 may be handled by virtualization module 160 directly. For example, virtualization module 160 may include the functionality necessary to implement a virtualized volume server, file server, or other type of mass storage architecture. In other embodiments, virtualization module 160 may instead provide interfaces through which virtual machines 200 may access storage that exists and is managed externally to virtualization module 160. For example, some other software component executing on physical system 100 or another system may be configured to provide mass storage as well as an application programming interface (API) through which to access storage. Virtualization module 160 may then be configured to pass storage access requests from virtual machines 200 to this external API.

Virtualization module 160 may be configured to support a number of different types of interfaces through which a client may interact with a particular virtual machine 200. For example, virtualization module 160 may be configured to perform basic terminal emulation to allow a client to provide textual input to virtual machines 200 and to return textual output for display to the client. In cases where a given virtual machine 200 supports more sophisticated user interfaces, such as windowing systems or other types of graphical user interfaces (GUIs) that may be hosted by software executing within given virtual machine 200, virtualization module 160 may be configured to pass input from the client's input devices (e.g., keyboard, pointing device, etc.) to given virtual machine 200 and to pass graphical output to the client.

In some embodiments, virtualized computing may be offered as an on-demand, paid service to clients, such as the Amazon EC2 service mentioned above. For example, an enterprise may assemble and maintain the various hardware and software components used to implement virtualized computing, and may offer clients access to these resources according to various pricing models (e.g., usage-based pricing, subscription pricing, etc.). Thus, clients may have access to a range of virtual computing resources without having to incur the costs of provisioning and maintaining the infrastructure needed to implement those resources. Generally speaking, to provide virtualized computing services to clients, virtualization module 160 may be configured to present a virtualized computing service API to clients, through which the clients may submit various types of requests for virtualized computing services. For example, as described in greater detail below, clients may submit requests via the virtualized computing service API for virtualized computing resources to be instantiated, initialized, and/or deleted. Clients may also submit requests for various computations to be performed by virtualized computing resources.

In the embodiment illustrated in FIG. 1, virtualization module 160 may be configured to present virtualized computing resources such as virtual machines 200 to clients as part of a web service via web services interface 230. Generally speaking, a web service may refer to computing functionality that is made available to clients through calls made by clients to one or more web services endpoints, where the web services endpoints are addressable by the clients according to an application-level, Internet-based transport protocol, such as the Hypertext Transfer Protocol (HTTP). For example, a web services endpoint may implement a particular API that defines the web services operations that clients may request. In some embodiments, web services interface 230 may be configured to implement the addressable web services endpoint(s), and may include functionality configured to receive and send web services request and response information with respect to clients.

To request that the web service perform a particular operation, clients may format the request in the manner specified by the API and convey the request to the addressable endpoint. For example, the endpoint may be addressable according to a Uniform Resource Indicator (URI) of the form "endpoint.domainname.toplevel" such as, e.g., virtualcomputing.company.com. Alternatively, the endpoint may be addressable according to a numeric-form address such as, e.g., an IP address.

In various embodiments, web services interface 230 may be configured to be invoked by clients in any of a number of suitable ways. For example, web services interface 230 may be configured to implement a Representational State Transfer (REST)-style web services architecture. Generally speaking, in a REST architecture, the requested web services operation and its various parameters may be appended to the web services call that is made to the web services endpoint according to the transport protocol. For example, the details of the requested operation may be included as parameters of an HTTP request method such as GET, PUT, or POST. Alternatively, web services interface 230 may be configured to implement a document- or message-oriented architecture. For example, the details of the requested operation may be formatted by the client as an eXtensible Markup Language (XML) document and encapsulated using a version of the Simple Object Access Protocol (SOAP). Upon receiving such a document, web services interface 230 may be configured to extract the details of the requested web services operation and attempt to perform the operation.

In the context of virtualized computing as a web service, it is contemplated that the API implemented by web services interface 230 may support any or all of the types of operations made available to clients by virtualization module 160. For example, the API may support the configuration, initialization, and termination of virtual machines 200 as discussed above with respect to FIG. 2. Additionally, in some embodiments, the API may support the exchange of input and output (textual, graphical, audio, or otherwise) between the client and virtual machines 200 or other virtualized resources.

Cryptographically Verified Repeatable Virtualized Computing

It is noted that in virtualized computing environments such as the one illustrated in FIG. 1, there exists a layer of functionality between virtual machines 200 and the physical system 100 on which the virtual machines execute: that is, the functionality of virtualization module 160 that organizes physical system resources into virtual machines 200. Thus, even though virtual machines 200 may behave like physical machines from the perspective of the code they execute, they may differ from physical machines in that virtualization module 160 may have detailed information about the configuration, internal state, and input/output (I/O) activity of each virtual machine 200.

That is, virtual machines 200 may exist entirely within a computing environment generated by virtualization module 160, such that any detail regarding information crossing the I/O boundary of a virtual machine 200 (and in some embodiments, any detail regarding the internal state of a virtual machine 200) may be observable by virtualization module 160. For example, if a virtual machine 200 conducts I/O operations (e.g., to send or receive network data, data from peripheral devices, etc.), these operations may be processed by virtualization module 160 before being conveyed to another virtual entity or a physical entity outside the virtualization environment. Likewise, as noted above with respect to FIG. 2, virtualization module 160 may be aware of the parameters with which virtual machines 200 were configured, and may be capable of monitoring and logging the internal and/or I/O state of virtual machines 200 during their operation.

Figure 3:
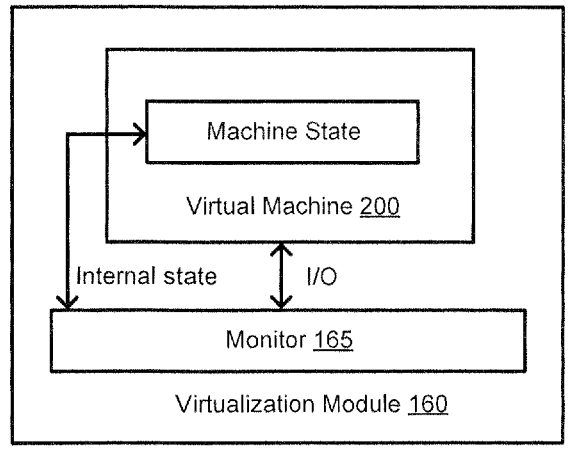
FIG. 3 illustrates an embodiment of a virtualization module, in accordance with various embodiments.

For example, as shown in FIG. 3, an embodiment of virtualization module 160 may include a monitor 165, which may be implemented as a routine, module, or any other suitable construct. In some embodiments, monitor 165 may be configured to coordinate and log I/O activity occurring with respect to virtual machine 200. Monitor 165 may further be configured to monitor and log aspects of the internal machine state of virtual machine 200, which may include memory images or any other state-bearing element of virtual machine 200.

By contrast, in a typical physical system that does not support virtualization, there may not exist any single entity or vantage point from which it is possible to observe the entire I/O boundary or internal state of the physical system. Thus, a virtualization environment may allow significantly greater access to the configuration and operating state details of a machine that executes operating system and application code than would otherwise be available.

The broad visibility into virtual machine state that is afforded by virtualization may facilitate the implementation of repeatable computing operations. As indicated above, reliable reproduction of results may depend on the degree to which the computing environment at the time of reproduction differs from the environment at the time the results were originally generated, because even minor differences in compilers, libraries, hardware, or other factors may impede repeatability. Correspondingly, it may be desirable to preserve as much information as possible about the original configuration of the computing environment (including cryptographic assurances of the configuration), and to recreate this configuration as faithfully as possible (or with more relaxed fidelity, if this is acceptable to the client) at the time the computation is repeated.

In some embodiments, virtualization module 160 may be configured to assist with both of these tasks. For example, when a client desires to perform a repeatable computation, virtualization module 160 may be configured to archive information describing the initial state and configuration of the virtual machine(s) 200 that will perform the computation as well as any inputs to be provided during computation, and to archive the terminal state of the virtual machine(s) 200 once the repeatable computation has terminated. As part of archiving this information, the virtualization module may also cause the information to be digitally signed using one or more cryptographic keys stored in a TPM that is embedded in the host computing device. Subsequently, to repeat the repeatable computation, virtualization module 160 may be configured to initialize the virtual machine(s) 200 according to the archived initial state, supply the archived inputs (if any) and cryptographic keys, initiate the computation, and compare the terminal state of the repeated computation against the archived terminal state of the original computation to determine whether the two versions of terminal state match. For example, the virtualization module may compare the hash measurements recorded during the original execution of the computation against the hash measurements obtained during the repeat of the computation in order to determine whether the results of the computation match.

Figure 4:
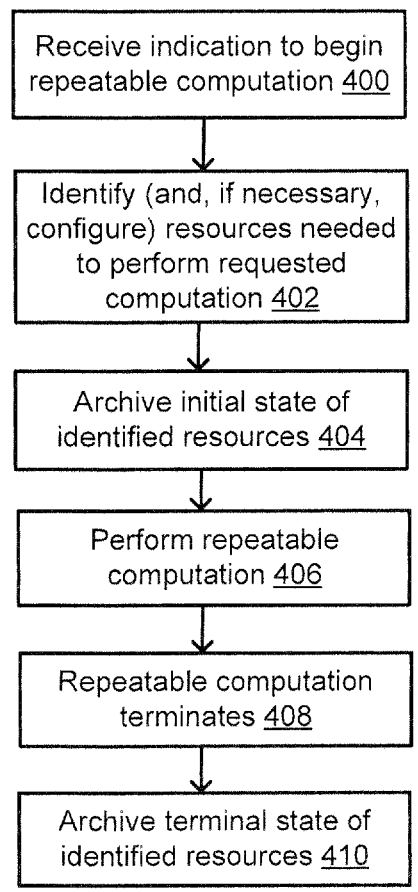
FIG. 4 illustrates an embodiment of a method of performing a repeatable computation, in accordance with various embodiments.

An embodiment of a method of performing a repeatable virtualized computation is shown in the flowchart of FIG. 4. Operation begins in block 400 where an indication to begin a repeatable computation is received. For example, when requesting that a virtual machine 200 be created or initialized, via web services interface 230 or otherwise, a client might specify that the virtual machine 200 should be configured for repeatable computing. In some embodiments, a client may request a repeatable computation with respect to resources that are already configured. For example, a client might use a configured virtual machine 200 for some period of time before requesting that the configured virtual machine 200 perform a repeatable computation.

The resources needed to perform the requested computation are then identified and, if necessary, configured for use (block 402). For example, a client may specify the number of virtual machines 200 that are desired, how they are to be configured (e.g., with respect to memory, performance, or other characteristics). The client may further specify other resources that are to be used and their characteristics, such as virtual network 210 and virtual storage 220, or any other resources that may be defined within the environment managed by virtualization module 160. In some embodiments, the client may identify the resources in detail, while in other embodiments, the client may simply identify a particular predefined configuration for some or all resources, and virtualization module 160 may be configured to identify the particular resources that correspond to the selected configuration.

For example, in the context of the Amazon EC2 virtualized computing service, a client might identify a number of instances and their types (e.g., small, large, extra-large, high-memory, high-CPU), which may correspondingly identify the requested virtual machines 200 and their configurations (e.g., amount of memory, amount of compute power, amount of virtual storage, and/or other relevant parameters). The client may also specify the AMI (machine image) for the various instances, and may identify any other mass storage devices (e.g., EBS volumes or other types of storage) that are to be used. In some instances, a client might specify the configurations of virtual resources with a greater level of detail. For example, the client might specify a particular processor architecture, manufacturer, or processor model to be used as the basis for a virtual machine 200. Alternatively, a client might be less sensitive as to the particular details of a configuration, but more concerned that the configuration details be reproducible with a high degree of fidelity. For example, the client might not specify processor configuration details, but might request that the details of whatever hardware is ultimately assigned to the client be recorded in detail so that on a later occasion, the initial configuration can be reproduced.

In at least some embodiments, the client may further specify a cryptographic key to be used to digitally sign the archived information, such as the state representations recorded during the various checkpoints in the computation. The key may be specified using one or more application programming interfaces (APIs) accessible over a network. In some cases, the key may further be wrapped using a different key stored in the TPM.

The initial state of the identified resources is archived (block 404). For example, virtualization module 160 may be configured to store information describing how the various virtual machines 200 and other resources to be used are configured, such as a list of virtual machines 200 along with parameters supplied or implied by the client, the configuration of virtual network 210 (if applicable), a list of the volumes of virtual storage 220 identified by the client, and/or any other configuration information. Virtualization module 160 may also be configured to store initial client-supplied state (e.g., a machine image or memory image specifying operating system code, application code, and data to be used) as well as any client-supplied inputs for the repeatable computation. In various embodiments, a machine image or memory image may be represented as a completely-specified or sparsely-populated map of a virtual machine's address space, indicating what data is located at which addresses.

To archive the initial state, virtualization module 160 may be configured to store the state data to any suitable type of storage system according to any suitable format or organization. For example, in various embodiments, physical system 100 may have access to local or networked storage devices that are available for use by virtualization module 160. Alternatively, virtualization module 160 may be configured to employ a web services-based storage service (e.g., Amazon's S3) for archival purposes.

In some embodiments, the archived initial state may also include information about physical system 100 that may not normally be visible to virtualization clients. For example, in a virtualization system, clients may typically be more concerned with the effective configuration and behavior of their virtual machines 200 than with the details of the underlying hardware and software that implement those machines. However, as noted above, repeatability may be influenced by such underlying details. Correspondingly, in some embodiments, virtualization software 160 may be configured to archive details about the hardware configuration of physical system 100 (e.g., information identifying processor 110 and/or other system components) as well as details about its software configuration (e.g., information identifying the type and version of operating system 150, virtualization software 160, and/or other components such as libraries, drivers, etc.).

In various embodiments, archiving the initial state may include generating hash measurements of the state of the computation (e.g., at one or more checkpoints in the computation). The hash measurements may be signed using a cryptographic key embedded in the TPM to ensure that the recorded state of the device is accurate and verifiable. Alternatively, the hash measurements may be signed and/or encrypted using one or more keys that are wrapped (i.e., encrypted) using the key embedded in the TPM 111. For example, in some embodiments, the user may specify a key to be used to sign the archived state and the user-specified key may be wrapped using a key embedded in the TPM to ensure authenticity of the archived state. In either event, the digital signature attached to the hash measurement by the TPM can be verified at a later time to confirm that the state of the computing environment at the time of the repeatable computation was indeed measured by verified processes on the host. For example, in some embodiments, the TPM may contain an embedded private key which is used to sign the hash measurement and the signature of the hash may be validated using a public key available to the user.

Figure 5A:
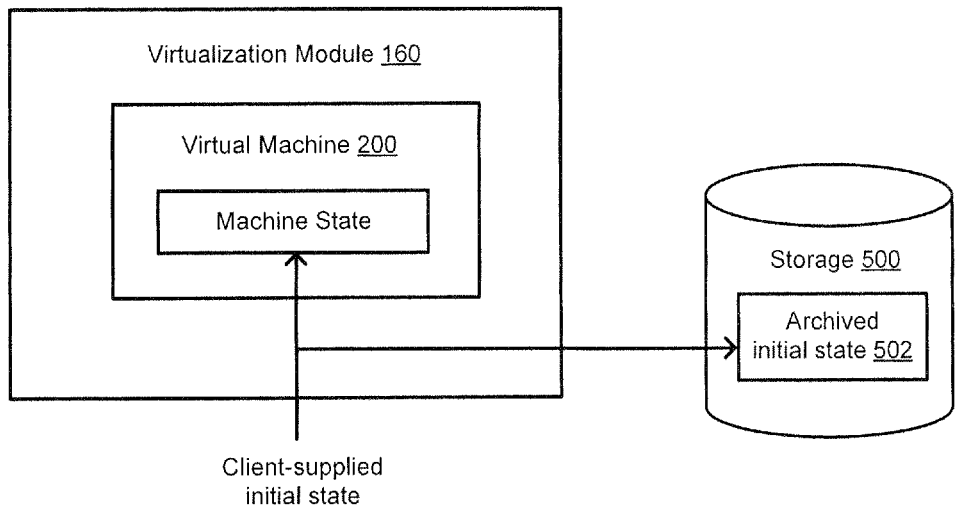
FIGS. 5A-B illustrate embodiments of the archival of initial and terminal state of a repeatable computation, in accordance with various embodiments.

An example system configuration illustrating the archival of initial state is shown in FIG. 5A. In the illustrated embodiment, client-supplied initial state including initial state of a virtual machine 200 may be supplied to virtualization module 160. Virtualization module 160 may accordingly initialize the virtual machine 200, and may also store the initial state within storage 500 as archived initial state 502. In various embodiments, storage 500 may correspond to any suitable physical, logical, or virtual device or medium configured for data storage. It is noted that archived initial state 502 may include initial state for elements other than virtual machine 200, such as virtual network 210 and virtual storage 220, though for simplicity, these are not shown in FIG. 5A.

The repeatable computation is then performed (block 406). For example, the requested virtual machine(s) 200 and their associated executable code may be launched and may execute in their usual fashion (i.e., as they might execute on a similar physical system). In some embodiments, the repeatable computation may receive inputs from external sources during operation (e.g., inputs not specified as part of the initial state). For example, the client might supply input from a mouse, keyboard, or other device, or a given virtual machine 200 may communicate with other virtual machines 200 or with other devices external to the virtualization environment. In some embodiments, virtualization module 160 may be configured to archive inputs and outputs that may occur during the course of the repeatable computation along with other archived state.

At some point, the repeatable computation terminates (block 408). For example, termination may occur upon notification by the client, upon the occurrence of some client-defined event (e.g., the termination of a particular application 245), or according to some other circumstance.

After termination of the repeatable computation, the terminal state of the identified resources is archived (block 410). Generally speaking, the terminal state may include any aspect of the state of the system that was subject to modification during the repeatable computation. For example, the terminal state may include the state of virtual machines 200, of virtual storage 220, and/or any other relevant state information. Correspondingly, virtualization module 160 may be configured to dump system images of virtual machines 200, take snapshots of storage volumes, etc. In various embodiments, the terminal state may or may not include information identifying how the virtual or physical system resources were configured. That is, the terminal state may or may not encompass all of the elements of the initial state discussed above.

It is noted that in some embodiments, resource state may be archived at checkpoints or intervals, rather than only once after the repeatable computation terminates. For example, "snapshots" of resource state may be taken at intervals measured in terms of elapsed time, events generated by the computation, or other suitable points in time, (In typical cases, where only a small amount of the resource state is expected to change in between snapshots, sparse data structure techniques may be employed to minimize the amount of storage needed to store the set of all resource state snapshots.) In some such embodiments, the terminal state may be understood to encompass the entire set of archived state generated during the course of the repeatable computation, including the interim state generated at the checkpoints or intervals.

In at least some embodiments, the terminal state of the identified resources may be archived by including a hash measurement of the state of the computing environment produced. The hash measurement may be signed using a cryptographic key embedded in the TPM to ensure that the state of the device is accurate and verifiable, as previously described.

Figure 5B:
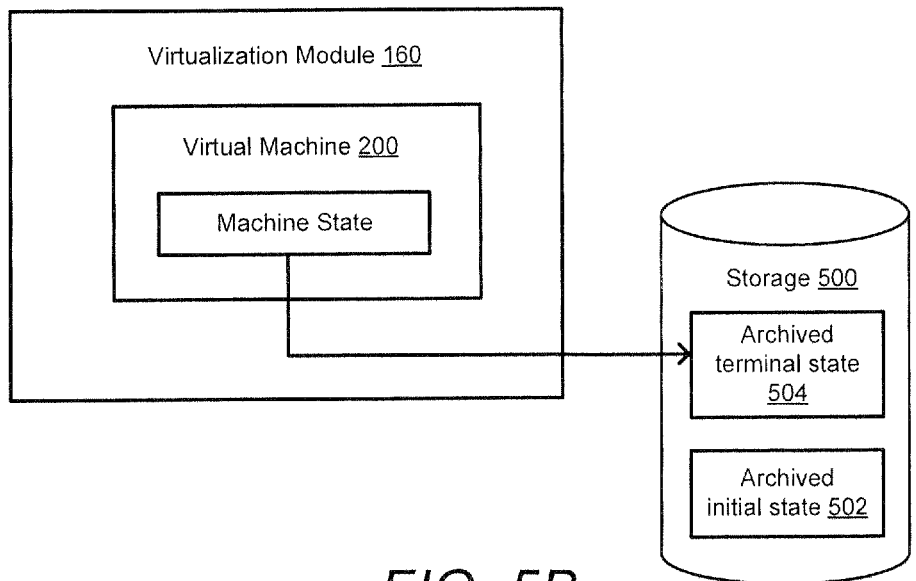

An example system configuration illustrating the archival of terminal state is shown in FIG. 5B. In the illustrated embodiment, virtualization module 160 may be configured to capture the state of virtual machine 200 within storage 500 as terminal state 504. Virtualization module may also be configured to copy the state of other elements for storage within terminal state 504, such as virtual network 210 and/or virtual storage 220 (not shown in FIG. 5B).

At some time after the original repeatable computation has completed, a client may request that the computation be repeated and validated against the original. In some embodiments, the process for repeating a repeatable computation may resemble the process described above for generating and archiving the original results, except that instead of receiving configuration information and input data from the client, the archived versions of this information may be used to configure, initialize, and run the virtual machine(s) 200.

Figure 6:
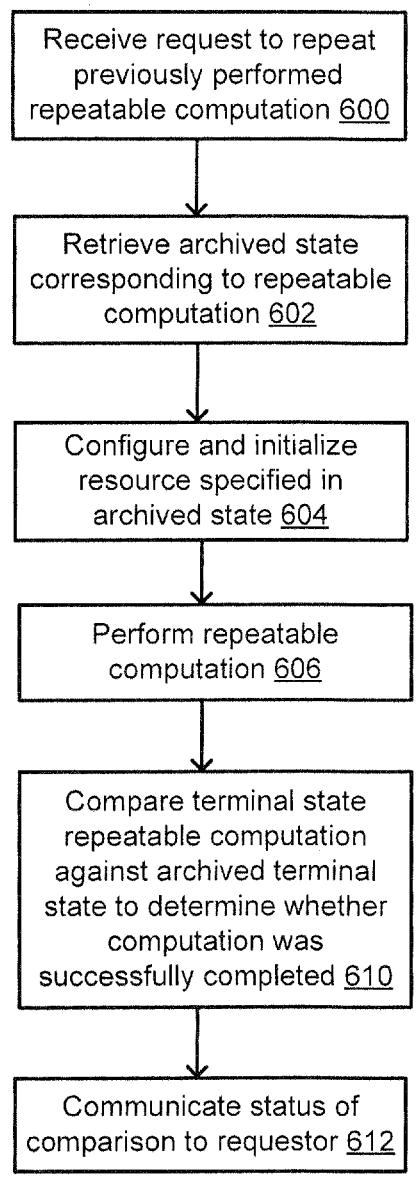
FIG. 6 illustrates an embodiment of a method of repeating a repeatable computation, in accordance with various embodiments.

FIG. 6 illustrates an example embodiment of a method of repeating a repeatable computation. In the illustrated embodiment, operation begins in block 600 where a request to repeat a previously performed repeatable computation is received. For example, the client that made the original request may also make the request to repeat, although the requesting entities may differ in other situations. In some embodiments, after a repeatable computation is initially performed, it may be repeated without an explicit request by the client. For example, it may be desirable to verify that a repeatable computation is in fact repeatable shortly after the computation is initially performed (and thus provide some degree of confidence that the repeatable computation should be repeatable at a later time). Correspondingly, in some cases, some or all of the actions shown in FIG. 6 may be performed as part of the process shown in FIG. 4, as a way of validating the repeatable computation and detecting any possible problems at an early stage of the life of the computation. For example, after the original terminal state is generated, the various actions shown in FIG. 6 may be performed to generate a test terminal state of the repeatable computation. The test terminal state may be similar to the new terminal state described below, except that it may be generated in the course of initially performing the repeatable computation rather than in response to a client request to subsequently repeat the repeatable computation.

The archived state corresponding to the repeatable computation may then be retrieved (block 602). For example, virtualization module 160 may be configured to assign unique identifiers to repeatable computations and to map these identifiers to locations of corresponding archived data. When a client specifies a particular unique identifier, virtualization module 160 may be configured to retrieve the corresponding state information, for example by retrieving archived initial state 502 and archived terminal state 504 from storage 500.

The virtualized computing resources specified in the archived state may then be configured and initialized (block 604). For example, virtualization module 160 may be configured to instantiate virtual machine(s) 200, virtual network(s) 210, virtual storage 220, and/or any other resources identified in the configuration information previously stored in the archived state. Virtualization module 160 may also be configured to initialize these resources according to the archived state. For example, if the archived state includes a memory image for a particular virtual machine 200, virtualization module 160 may use this memory image as the initialized state for the newly instantiated version of the particular virtual machine 200.

In embodiments where information about underlying physical resources is also present within the archived state, virtualization module 160 may also attempt to use this information. For example, if archived state information indicates that a particular type of processor 110 or physical system 100 was used, virtualization module 160 may attempt to assign processes that implement virtual machine(s) 200 to execute on the indicated physical hardware, if it is available.

After being initialized from the archived state, the repeatable computation is then performed (block 606). For example, the virtual machine(s) 200 and their associated executable code, as identified within the archived initial state information, may be launched and may execute in their usual fashion. In embodiments where inputs were captured during the course of the original computation (e.g., inputs from peripheral devices, network traffic, etc.), the archived versions of these inputs may be supplied as inputs during the repeatable computation.

In some embodiments, the repeatable computation may receive inputs from external sources during operation (e.g., inputs not specified as part of the initial state). For example, the client might supply input from a mouse, keyboard, or other device, or a given virtual machine 200 may communicate with other virtual machines 200 or with other devices external to the virtualization environment. In some embodiments, virtualization module 160 may be configured to archive inputs and outputs that may occur during the course of the repeatable computation along with other archived state.

The repeatable computation eventually terminates (block 608). For example, the repeatable computation may terminate under any of the same conditions noted above with respect to its original execution. The terminal state of the repeatable computation is compared against the archived terminal state to determine whether the repeatable computation was successfully repeated (block 610), and the status of the comparison (e.g., success or failure) is communicated to the requestor (block 612).

In various embodiments, the criteria for determining what constitutes a successful repeated computation may be supplied by the client. For example, a client may indicate that the success criterion requires that the newly generated state of virtual machine(s) 200 and virtual storage 220 exactly match the archived terminal state of these elements from the original computation (e.g., the state of all memory address spaces, virtual processor state, and virtual storage blocks must match). In other cases, a client may indicate only that only a portion of the total state needs to match archived terminal state. For example, repeatability may be satisfied if the same values are generated for a defined set of result variables stored in memory rather than an entire memory address space. Correspondingly, a client may identify and require a comparison with respect to only certain regions of memory, certain files or regions of storage, and/or portions of other state. In such an embodiment, mismatches between newly generated state and archived terminal state that occur outside the specified portions of state to be considered may not affect the overall determination of successful repetition.

The success criterion may also make use of hash functions. Generally speaking, a hash function may correspond to any function configured to reduce a large, possibly variable-size portion of input data to a smaller, usually fixed-size output.

Hash functions may include checksums, cryptographic hash algorithms (e.g., MD5, Secure Hash Algorithm (SHA), or other types of cryptographic hashes), fingerprint algorithms, or other suitable functions. In some embodiments, instead of determining whether all or a portion of the original and new terminal state match, a hash function may be separately applied to all or a relevant portion of the original terminal state, and all or a relevant portion of the new terminal state. The outputs of the hash functions as applied to the two versions of terminal state may then be compared, and success may be determined on the basis of whether or not these outputs (rather than the terminal state itself) match. In some instances, employing hash functions may reduce the amount of time required to determine successful repetition. For example, if the original terminal state is hashed when the repeatable computation is originally performed, then following an attempt to repeat the computation, it may be necessary only to hash the new terminal state rather than compare the entirety of the original and new terminal states.

As noted above, during the original performance of the repeatable computation, the original terminal state may include interim state stored at checkpoints or intervals during the computation. Similarly, when the repeatable computation is repeated, the new terminal state may include a similar set of interim state stored at analogous checkpoint or intervals during the repeated computation. In some embodiments, the process of determining whether the computation has been successfully repeated may include comparing the original and new terminal state at some or all of the checkpoints. For example, if N checkpoints had been generated, then N discrete sets of original and new terminal state may be compared. In some embodiments, the degree of successful repetition may be determined according to the number of checkpoints that were successfully compared. For example, instead of success being defined in binary terms (e.g., success or failure), success may be reported along a continuum (e.g., 10% success of 10% of checkpoints matched, 90% success if 90% of checkpoints matched, or some other function).

In general, the degree to which a computation may be successfully repeated may depend on the degree to which variability in factors affecting the computation can be controlled, as between the original computation and the attempted repetition of that computation. For example, as discussed above, variations in the initial configuration and state of a virtual machine 200 may be controlled by archiving these details, and then recreating and restoring a new virtual machine 200 to be consistent with the archived state.

Another source of variability that may affect computational repeatability is the nature of the inputs provided to the computation. For example, in one instance, a computation might be dependent solely on static, self-contained data, such that the computation might be implemented entirely by a single virtual machine 200 (possibly in conjunction with virtual storage 220), and without dependence upon performing I/O with respect to other virtual machines 200 or other entities. In such a situation, repeating the computation may be simply a matter of configuring the single virtual machine 200, initializing its state, initiating the computation, and waiting for it to complete—coordination of I/O to the computation other than mass storage I/O may be unnecessary. Such a computation may exhibit little sensitivity to input variability, because the inputs can be defined and initialized at a single point in time.

By contrast, a networked computation that depends upon inputs that are outside the control of the virtualization system may be more sensitive to input variability. For example, during a computation, a virtual machine 200 may exchange data with a remote computer system (e.g., via the Internet, a LAN, or other network). However, if the computation is repeated, the communication behavior of the remote system may differ from its prior behavior. For example, the remote system may be unavailable, or the network between the virtual machine 200 and the remote system may deliver packets with a different latency or in a different order. Any of these differences may introduce nondeterministic variability into the computation that may cause its terminal state to differ from the original computation.

In some embodiments, virtualization module 160 may be configured to offer various input-handling options to clients performing repeatable computing. For example, when requesting that a repeatable computation be performed, a client may specify that the computation be run in a limited I/O mode, which may also be referred to as a "strict" or "mandatory" mode. In some embodiments, when this mode of operation is requested, virtualization module 160 may be configured to prevent any external I/O (e.g., I/O that crosses the boundary of virtualization module 160) from occurring with respect to virtualized resources such as virtual machines 200.

For example, when a particular virtual machine 200 is configured in this limited I/O mode of operation, virtualization module 160 may prevent external network data or peripheral data (e.g., mouse or keyboard data) from being input to the particular virtual machine 200, e.g., by intercepting and discarding such data. (In some embodiments, input data from virtual storage 220 may still be allowed in this mode.)

Generally speaking, enforcing strong limitations on the that may occur during a computation may increase the likelihood that the computation will be successfully repeated. Such limitations may have the effect of containing or encapsulating the computation, in that by limiting external, possibly nondeterministic influences on the computation's state, a strong boundary around that state can be defined. For example, if no I/O is allowed to occur during operation of a virtual machine 220, then the behavior of that virtual machine 220 will be largely or entirely defined by its initial state. Such limitations on I/O may limit a client's flexibility in terms of the types of computations that may be performed. However, such limitations may also simplify the client's burden of initializing and performing a repeatable computation, in that the client need not account for (and attempt to control) external influences.

By contrast, in some instances, a client may not want to limit I/O as stringently as described above. For example, the client's application may be a networked application that is specifically tailored to be run in a networked environment using multiple distinct machines. In some embodiments, the client may have several options. In one scenario, if the client's application can be entirely implemented within the virtualization domain managed by virtualization module 160 (e.g., it can be mapped to a set of virtual machines 200 that may communicate via virtual network 210), then virtualization module 160 may be configured to log and archive the I/O occurring between the virtual resources, thus preserving the repeatability of this I/O.

Alternatively, the client may request that the computation be run in a relaxed I/O mode of operation, which may also be referred to as an "advisory" mode. In some embodiments, when this relaxed mode of operation is requested, virtualization module 160 may be configured to allow external I/O (e.g., I/O that crosses the boundary of virtualization module 160, such as network accesses to external resources) for virtualized resources such as virtual machines 200. For example, in this relaxed I/O mode of operation, a virtual machine 200 may be permitted to interact with a resource that is outside the virtualization domain controlled by virtualization module 160, such as an external web service or other resource external to physical system 100.

Relaxed I/O constraints may broaden the types of computations a client may perform. However, such relaxed I/O constraints may also introduce the possibility of nondeterminism, which may affect the repeatability of a computation. For example, as noted above, attempts to repeat external I/O may result in different latencies or different response ordering than during the original computation, which may influence the terminal state of the computation.

The client may choose to accept the burden of this nondeterminism in exchange for the flexibility afforded by the relaxed I/O constraints. For example, the client may attempt to control or coordinate the external resources to ensure that they produce consistent results across different invocations of a repeatable computation. The client may also attempt to define the criteria for successful repetition in a manner that is insensitive to the potential effects of nondeterminism. For example, instead of requiring that the entire terminal state of a virtual machine 200 match archived terminal state, the client may require only that certain values match (e.g., values corresponding to particular memory locations, machine registers, particular files in the file system or logical blocks within a block device, etc.). If possible, the client may then organize the computation to produce those values in a manner that is robust with respect to the effects of I/O ordering and latency.

Thus, by choosing the degree to which computation inputs are restricted from among options implemented by virtualization module 160, a client may effectively choose the degree to which repeatability of a computation may be achieved. Additionally, as mentioned above, a client may also control many aspects of the configuration and initialization of virtualized resources by providing appropriate inputs to virtualization module 160.

It is contemplated that in some embodiments, a customer may configure only some virtualized resources for repeatable computing. For example, a client may request that multiple different virtual machines 200 be instantiated and configured by virtualization module 160, but may specify that only a proper subset (i.e., fewer than all) of the different virtual machines 200 be configured for repeatable computing. Correspondingly, the repeatable computing techniques described above (e.g., with respect to archiving and restoring initial and terminal state) may only be performed with respect to the virtual machines 200 that are configured for repeatable computing. The remaining virtual machines 200 may be configured operate without taking any particular measures to ensure the repeatability of their results.

As noted above with respect to FIGS. 4 and 6, in some embodiments, virtualization module 160 may be configured to include configuration information about physical system 100 when archiving the initial state of a repeatable computation. Correspondingly, when preparing to repeat the repeatable computation, virtualization module 160 may attempt to assign processes that implement the repeatable computation to underlying hardware and software that have the same characteristics as physical system 100.

As part of a virtualization service offered to clients using a system like that shown in FIG. 1, clients may be offered a guarantee that their repeatable computations will be supported for some length of time (e.g., a period of years), or indefinitely. For example, an enterprise may offer repeatable virtualized computing services for a fee, and might charge a higher fee for a longer guarantee period. To support the guarantee, the enterprise may need to ensure that the computational infrastructure (i.e., hardware and software) used by a client remains available for the duration of the guarantee.

To facilitate retention of this infrastructure, in some embodiments, the enterprise may maintain different classes of infrastructure. A particular one of the classes may be specifically associated with repeatable computing, and the enterprise may direct all client requests for repeatable computing to the particular class. Systems included in the particular class may have the same configuration for the purposes of repeatable computing (i.e., they may differ in ways that do not affect computational results), and this configuration may be preserved over time. By contrast, systems included in other classes may be upgraded or altered as the enterprise deems appropriate. By defining a particular, uniform class of computational infrastructure for repeatable computing, the enterprise may simplify retention of this infrastructure relative to embodiments where repeatable computations are allowed to execute on a variety of infrastructure configurations.

It is contemplated that in some embodiments, a repeatable computation may be deliberately performed on different infrastructure than what was used during its original execution. For example, when deploying a new infrastructure, such as a new system configuration for virtualized computing, it may be desirable to ascertain whether the new infrastructure behaves in the same way as a prior infrastructure. One way to make this determination is to identify a computation that exercises aspects of the infrastructure that may be sensitive to configuration changes. Such a computation, which may also be referred to as an acceptance suite, might include a number of different applications configured to perform different aspects of the computation. For example, as noted above, high-precision arithmetic may exhibit subtle changes when run using different hardware or software. Correspondingly, an acceptance suite might include a number of routines configured to test arithmetic operations using different numerical data patterns. These operations may be tested under various conditions chosen to expose differences, if they are present.

Once developed, an acceptance suite may be run on an existing infrastructure to generate a baseline set of data. In some embodiments, the acceptance suite may be run as a repeatable computation using the techniques described above, e.g., with respect to FIG. 4. The acceptance suite may then be repeated on the new infrastructure using the archived initial and terminal state from the existing infrastructure using the techniques described above, e.g., with respect to FIG. 6. If the behavior of the new infrastructure matches that of the existing infrastructure (e.g., according to a comparison of terminal state under whatever criteria are specified by the acceptance suite), then the new infrastructure may be considered functionally equivalent to the existing infrastructure, at least with respect to the aspects of the infrastructure that are exercised by the acceptance suite. If the different infrastructures' behavior diverges with respect to the acceptance suite, then the new infrastructure may be rejected, or at least avoided for use with repeatable computations that depend on the existing infrastructure.

Figure 7:
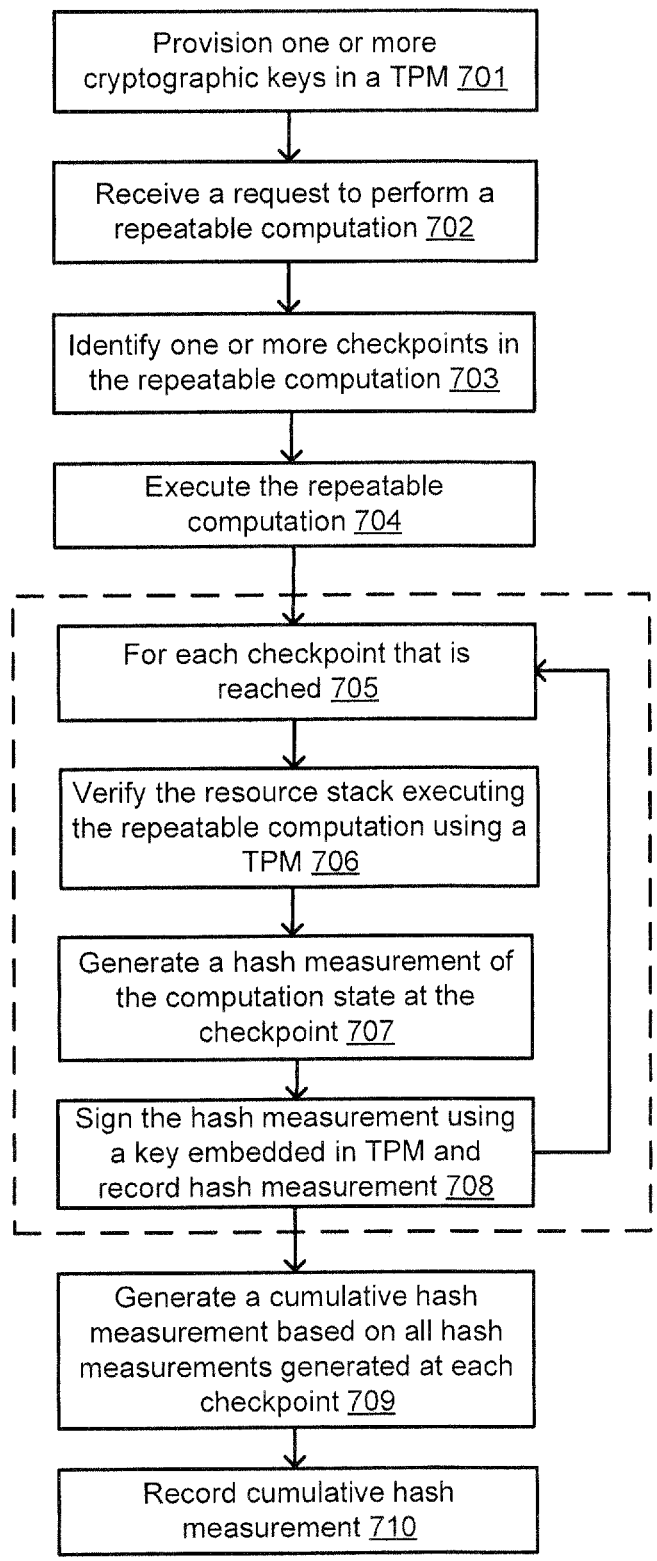
FIG. 7 illustrates an embodiment of a method for initially executing a repeatable computation using a trusted platform module (TPM) to verify the state of the computing environment, in accordance with various embodiments.

FIG. 7 illustrates an embodiment of a method for initially executing a repeatable computation using a trusted platform module (TPM) to verify the state of the computing environment, in accordance with various embodiments. In operation 701, a trusted platform module (TPM) on the host computing device is provisioned with one or more cryptographic keys. These keys can later be used to digitally sign the hash measurements of the state of the repeatable computation. In some embodiments, the cryptographic key may be a private key that corresponds to a public key used to verify that a set of data has been signed using the private key.

In operation 702, a request is received by the host computing device to perform a computation that has been identified as being repeatable. For example, a user may utilize an API presented by the virtualization module to submit a request that a repeatable computation be performed by a virtual machine owned by the user. As part of submitting the request, the user may specify a set of input data to be used with the repeatable computation.

In operation 703, the virtualization module or other component can identify one or more checkpoints in the repeatable computation. For example, the checkpoints may include a checkpoint before starting the repeatable computation, one or more checkpoints during the process of performing the computation and a checkpoint after the repeatable computation is completed. In some embodiments, the system may automatically identify one or more default checkpoints based on various characteristics of the computation. In other embodiments, the user requesting the repeatable computation may specify the specific checkpoints for their particular computation by using the API or other mechanism. Additionally, the user may be enabled to configure the logs produced during the repeatable computation and the locations where those logs should be recorded. As such, the customer may be allowed to specify some additional configuration information in addition to the checkpoints that should be performed.

Once the checkpoints have been identified, the one or more virtual machines may be used to execute the repeatable computation, as shown in operation 704. During the execution of the computation, for every checkpoint that is reached (operation 705), the host computing device may execute a number of operations by using the TPM embedded in the host computing device. For example, in operation 706, the TPM is used to verify the resource stack that is executing the repeatable operation. This can be performed based on a set of initial boot measurement values that have been recorded in the TPM at the time of booting the host computing device. Thus, in operation 706, at each checkpoint, a set of runtime measurements are obtained of the software and hardware stack and these runtime measurements are compared to the respective initial boot measurement values recorded in the TPM to verify that the host computing device and the software running thereon have not been tampered with since the booting of the device. If the boot time measurements are in any way different from the runtime measurements obtained at the checkpoint, the host computing device may be treated as having been compromised and appropriate corrective actions may be initiated.

In operation 707, the host computing device may generate a representation of the state of the computing environment at that particular checkpoint. For example, the state of the computing environment can include hash measurements of the virtual machine configuration information, data in the registers of the general purpose processor(s) involved in the repeatable computation, any number of memory locations that may be used by the computation at any given checkpoint, input data, as well as any other information relevant to executing the repeatable computation. The host computing device can generate a hash measurement (or other representation) of the state of the computation at each checkpoint. This hash measurement can be signed by using one or more cryptographic keys provided by the TPM, as shown in operation 708. For example, the hash measurement can be signed using a key embedded in the TPM. Alternatively, the hash measurement may be signed using a key provided by the user requesting the repeatable computation, where the user-provided key is wrapped (i.e., encrypted) using the key embedded in the TPM. The signing of the hash measurement by using the key in the TPM can provide a verifiable method of proving (using the TPM) that the state of the underlying platform is accurate and is not being misrepresented or has not been tampered with by various unsecured processes running on the host computing device.

In various embodiments, the TPM can also be used to tie the signature to the state of the host computing device. For example, when the software environment is loaded on the host device, the cryptographic hashes can be recorded in the TPM. The TPM can then sign the values by sealing the signature to those cryptographic hashes. As such, during the checkpointing process, every time the TPM signs a checkpoint, it can seal that signature to the hash values to the values in the platform configuration registers (PCR) of the TPM. This can verify that not only was this computation done, but it was done on a trusted software stack, which is verified every time the checkpoint is done. This provides the additional guarantee that the software process that is running did not corrupt the key used to sign the checkpoint.

As noted above, during the execution of the repeatable computation, a number of different hash measurements can be generated for each checkpoint. This can ensure that there is no divergence from start to finish in terms of sequence of operations or the state captured. This can also be used to track the computation success. Furthermore, once the repeatable computation has completed, a cumulative hash measurement can be generated based on all of the summaries at each checkpoint, as shown in operation 709. This cumulative hash measurement can be signed and recorded (operation 710) using cryptographic keys provided by the TPM, as previously described. The cumulative hash measurement can be subsequently used to verify the success of repeating the entire computation since the cumulative summary generated by the repeated execution of the computation will only match the original cumulative summary if the summaries generated at each checkpoint also match.

Figure 8:
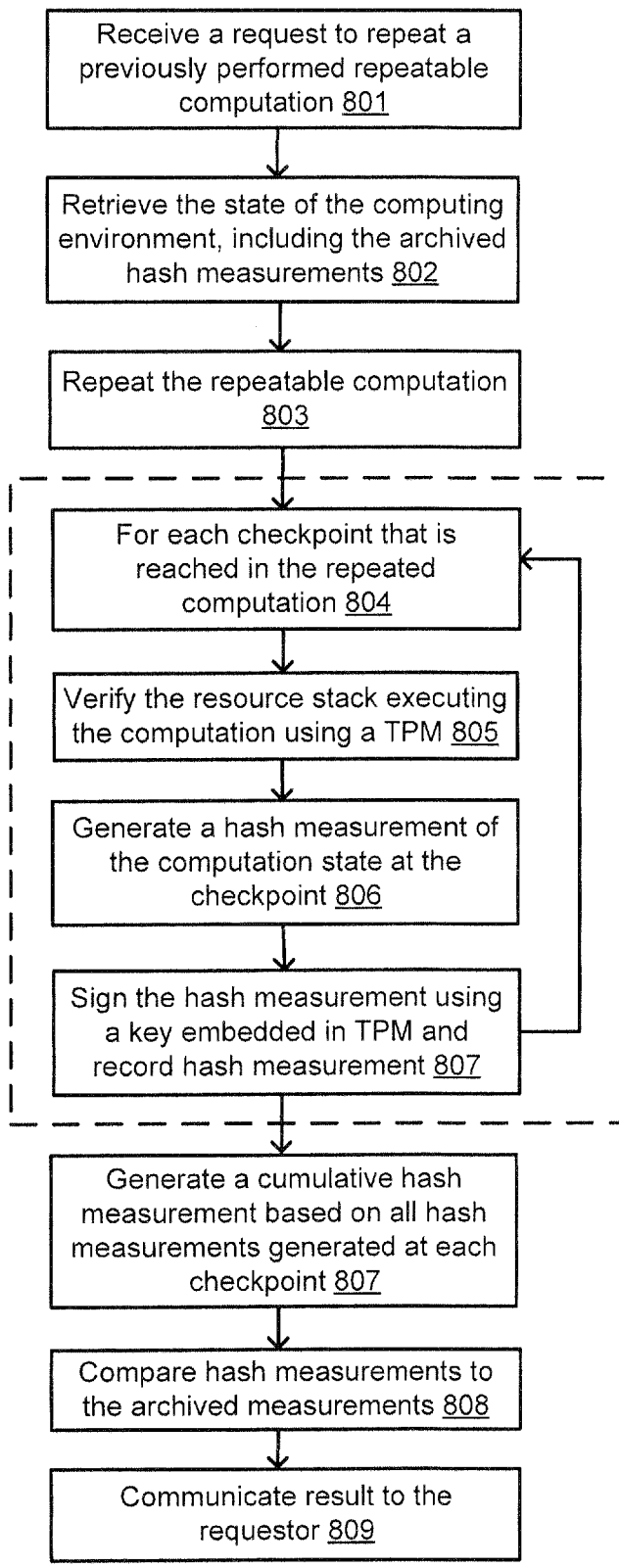
FIG. 8 illustrates an embodiment of a method for repeating the execution of a repeatable computation using a trusted platform module (TPM), in accordance with various embodiments.

FIG. 8 illustrates an embodiment of a method for repeating the execution of a repeatable computation using a trusted platform module (TPM), in accordance with various embodiments. In operation 801, a request is received to repeat a previously performed repeatable execution. The request to repeat the computation may be submitted by the user that originally requested the repeatable computation to be performed or by another requestor. In operation 802, the state of the computing environment, including any archived hash measurements is retrieved by or provided to the host computing device. In addition to retrieving whatever state and archived hash measurements, the host computing device may also be provided with a cryptographic key to verify the signatures of the various TPM generated summaries, as previously described.

In operation 803, the one or more virtual machines on host computing device repeat the execution of the repeatable computation. During the repeated execution, the system may utilize checkpoints as previously described, For example, for each identified checkpoint in the execution (804), the TPM on the host computing device can be used to verify the resource stack running on the host computing device, as shown in operation 805. This can be performed to verify that the state of the host computing device is accurate and is not being tampered with by various processes. For example, by comparing the boot measurement values stored in the TPM to the runtime measurement values obtained at the checkpoint, it can be verified that the resource stack executing the repeatable computation has not been tampered with since the booting of the computing device.

In operation 806, the host computing device can generate a hash measurement (or other representation) of the state of the computation at the checkpoint. This hash measurement can be signed using one or more cryptographic keys stored in the TPM and recorded, as shown in operation 807. In some embodiments, the hash measurements of the computation state can be compared to the recorded hash measurements at each checkpoint. Based on the comparison, the system can identify when any checkpoint in the process has failed to match and can thus provide information about which portions of the process of the repeatable computation have been successfully repeated and which have not. For example, if the process of the repeatable computation proceeds to 90% completion and then fails the next checkpoint, the requestor can be provided with information indicating which checkpoints have failed to successfully repeat. Alternatively, the comparison of all recorded hash measurements may be performed after completion of the computation, as described below.

In operation 807, once the computation is repeated, the system can generate a cumulative hash measurement based on all of the hash measurements generated during the repeat of the computation. In operation 808, the hash measurements generated during the repeated computation can then be compared to the archived (i.e. recorded) hash measurements in order to determine whether all or some of the hash measurements match. In some embodiments, each hash measurement recorded at each checkpoint can be compared to the hash measurement at the respective checkpoint generated during the repetition of the computation. In other embodiments, only the cumulative hash summary recorded after the original execution of the computation is compared to cumulative hash summary generated after the repeated execution of the computation. Because the cumulative measurements will only match if the hash measurements at each checkpoint match, it can be determined with a high precision that the repeatable computation was successful. The results of the comparisons may then be communicated to the requestor, as shown in operation 809.

Figure 9:
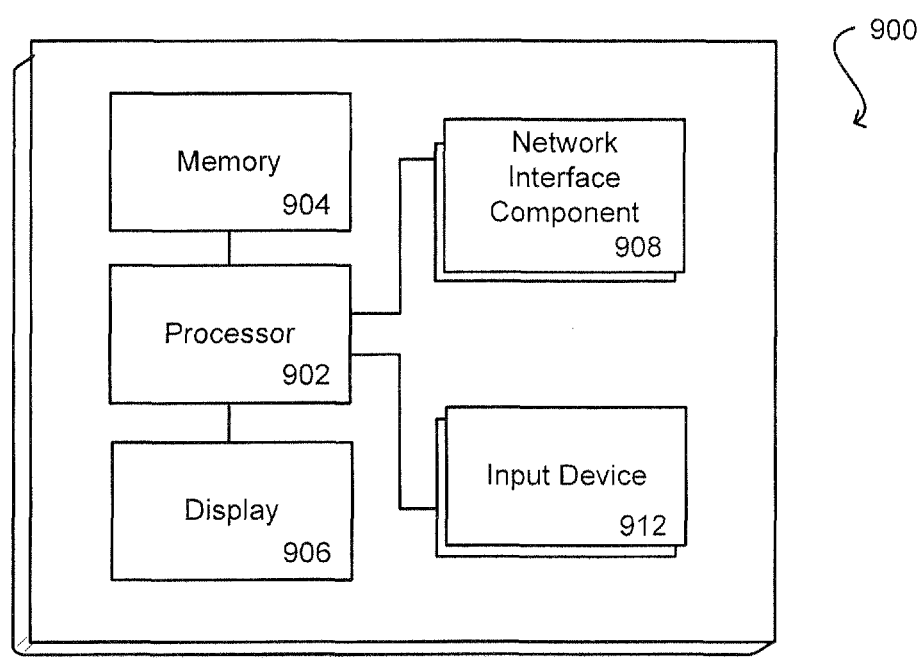
FIG. 9 illustrates a logical arrangement of a set of general components of an example computing device that can be utilized in accordance with various embodiments.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 908 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface elements 908 for communicating over various networks, such as a Wi-Fi, Bluetooth, RF, wired, or wireless communication systems. The device in many embodiments can communicate with a network, such as the Internet, and may be able to communicate with other such devices.

Figure 10:
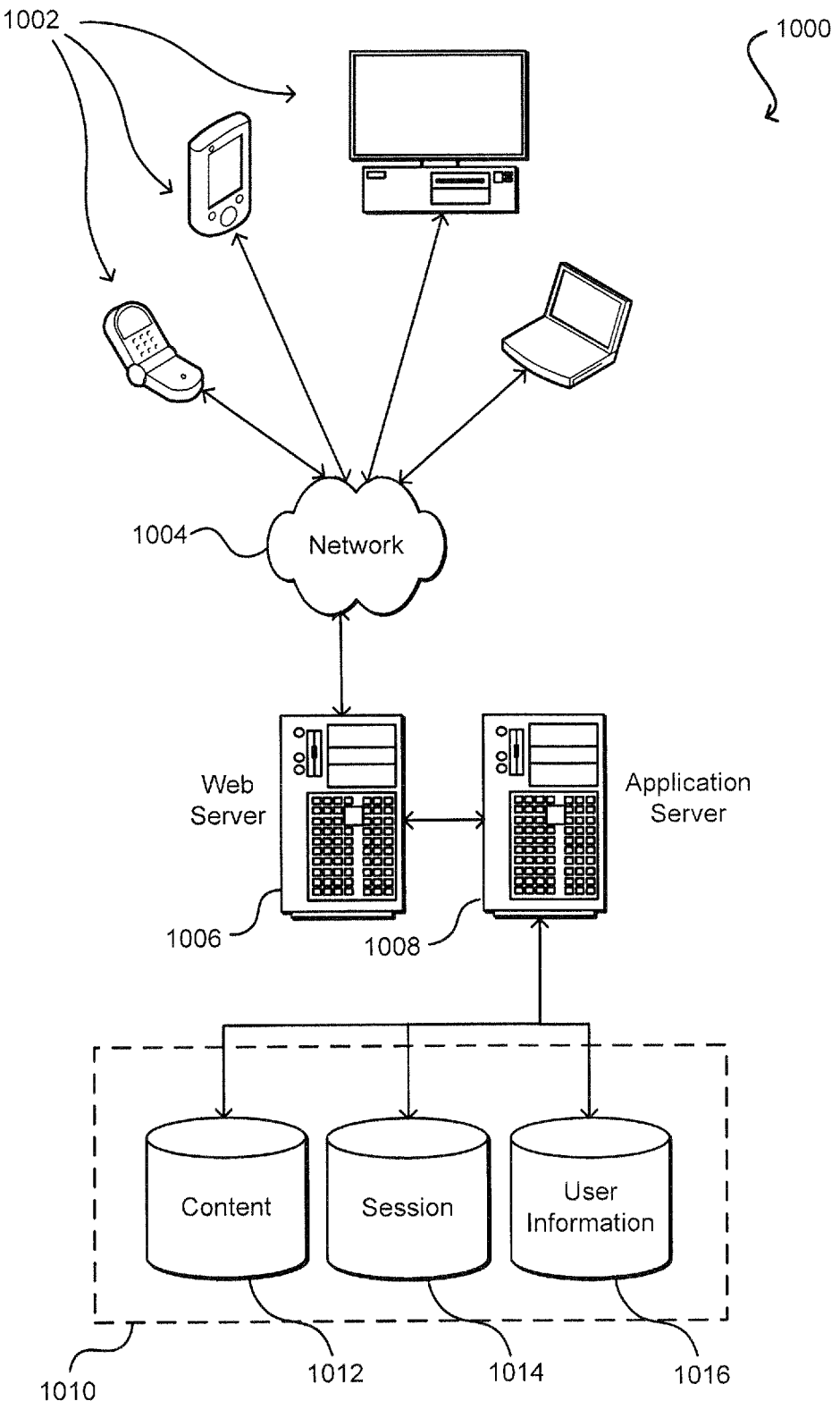
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, FTP, UPnP, NFS and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer readable storage medium storing one or more sequences of instructions for performing a repeatable computation, the instructions executed by one or more processors to:
   receive, from a client, a request to perform the repeatable computation by a virtual machine provisioned for the client on a host computing device;
   identify checkpoints in the repeatable computation and execute the repeatable computation using the virtual machine;
   determine whether each checkpoint of the checkpoints in the repeatable computation has been reached to yield a determination, and based on the determination:
      verify a state of a computing environment on the host computing device at a time of the checkpoint by using a trusted platform module on the host computing device;
      generate a hash measurement of a state of the repeatable computation at the time of the each checkpoint, wherein the state of the repeatable computation captures output of the repeatable computation running at the each checkpoint;
      cryptographically sign the hash measurement of the state of the repeatable computation at the time of the each checkpoint using a key embedded in the trusted platform module of the host computing device to yield a signed hash measurement; and
      record the signed hash measurement; and
   generate a cumulative hash measurement of the repeatable computation based on all of the hash measurements generated at the checkpoints.

2. The non-transitory computer readable storage medium of claim 1, further comprising instructions executed by one or more processors to:
   receive a request to repeat the repeatable computation;
   execute the repeatable computation a second time to produce a new cumulative hash measurement; and
   compare the recorded cumulative hash measurement to the new cumulative hash measurement of the repeatable computation; and
   provide an indication of whether the recorded cumulative hash measurement matches the new cumulative hash measurement.

3. The non-transitory computer readable storage medium of claim 2, wherein executing the repeatable computation a second time further comprises:
   comparing the hash measurement of the state of the repeatable computation at the each checkpoint to a new hash measurement of the state of the repeatable computation generated during a respective checkpoint of the repeatable computation executed at the second time.

4. The non-transitory computer readable storage medium of claim 1, further comprising instructions executed by one or more processors to, based on the determination:
   verify the state the of the computing environment at the time of the checkpoint by comparing the hash measurement of the state of the repeatable computation to a boot measurement value stored in the trusted platform module, the boot measurement value obtained by the trusted platform module during a booting of the host computing device.

5. The non-transitory computer readable storage medium of claim 1, wherein the state of the computing environment includes values from one or more of: a Basic Input and Output System (BIOS) of the host computing device, a boot record of the host computing device, a configuration of a virtualization module of the host computing device, or binary executable files executing on a guest operating system installed on the one or more virtual machines.

6. A computer implemented method, comprising:
   under the control of one or more computer systems configured with executable instructions,
   receiving a request to perform a computation identified as a repeatable computation performed by a provisioned virtual machine;
   executing the repeatable computation on the provisioned virtual machine, wherein the provisioned virtual machine is executed on a host computing device that includes a trusted platform module;
   identifying a checkpoint in the repeatable computation; and
   in response to reaching each checkpoint in the repeatable computation,
      generating a hash measurement of a state of the repeatable computation on the host computing device at a time of the checkpoint, the hash measurement capturing output of the repeatable computation at the time of the checkpoint; and
      signing the hash measurement of the state of the repeatable computation using a cryptographic key stored in the trusted platform module of the host computing device; and
      recording the signed hash measurement of the state.

7. The computer implemented method of claim 6, further comprising:
   enabling a user to specify the checkpoint using an application programming interface presented by the host computing device, the application programming interface being accessible over a network connection.

8. The computer implemented method of claim 6, wherein the cryptographic key used to sign the representation of the state of the repeatable computation is provided by a user and wrapped using a second key embedded in the trusted platform module.

9. The computer implemented method of claim 8, wherein the key used to sign the representation of the state of the repeatable computation is deleted by the host computing device after performing the repeatable computation.

10. The computer implemented method of claim 6, wherein the request to perform the repeatable computation includes a set of input data, and wherein executing the repeatable computation yields a set of output data, and wherein a representation of the input data and the output data is saved along with the representation of the state of the repeatable computation on the host computing device.

11. The computer implemented method of claim 6, further comprising:
   receiving a request to repeat the repeatable computation;
   executing the repeatable computation a second time to produce a new representation of state of the repeatable computation;

comparing the recorded representation of the state to the new representation of the state of the repeatable computation; and providing an indication of whether the recorded representation of the state matches the new representation of the state.

12. The computer implemented method of claim 6, further comprising:

in response to reaching each checkpoint in the computation, verifying the state the of the repeatable computation at the time of the checkpoint by comparing the hash measurement of the state of the repeatable computation to a boot measurement value obtained during boot time of the host computing device.

13. A computing system, comprising:

a cryptographic module;

at least one processor; and memory including instructions that, when executed by the at least one processor, cause the computing system to:

receive a request to perform a repeatable computation on a provisioned virtual machine;

execute the repeatable computation on the provisioned virtual machine, wherein the provisioned virtual machine is executed on a host computing device that includes a trusted platform module;

identify a checkpoint in the repeatable computation; and in response to reaching each checkpoint in the repeatable computation, generate a hash measurement of a state of the repeatable computation on the host computing device at a time of the checkpoint, the hash measurement capturing output of the repeatable computation at the time of the checkpoint;

sign the hash measurement of the state of the repeatable computation using a cryptographic key stored in the trusted platform module of the host computing device; and record the signed representation hash measurement of the state.

14. The computing system of claim 13, wherein the memory further comprises instructions executed by the at least one processor to cause the computing system to:

enable a user to specify the checkpoint using an application programming interface presented by the host computing device, the application programming interface being accessible over a network connection.

15. The computing system of claim 13, wherein the cryptographic key used to sign the representation of the state of the repeatable computation is provided by a user and wrapped using a second key embedded in the cryptographic module.

16. The computing system of claim 15, wherein the cryptographic key used to sign the representation of the state of the repeatable computation is deleted by the host computing device after performing the repeatable computation.

17. The computing system of claim 13, wherein the request to perform the repeatable computation includes a set of input data, and wherein executing the repeatable computation yields a set of output data, and wherein a representation of the input data and the output data is saved along with the representation of the state of the computing environment on the host computing device.

18. The computing system of claim 13, wherein the memory further comprises instructions executed by the at least one processor to cause the computing system to:

receive a request to repeat the repeatable computation;

execute the repeatable computation a second time to produce a new representation of the state of the repeatable computation; and compare the recorded representation of the state to the new representation of the state of the repeatable computation; and provide an indication of whether the recorded representation matches the new representation.

\* \* \* \* \*